US012168934B2

(12) United States Patent
Lee

(10) Patent No.: US 12,168,934 B2
(45) Date of Patent: Dec. 17, 2024

(54) TURBINE VANE PLATFORM SEALING ASSEMBLY, AND TURBINE VANE AND GAS TURBINE INCLUDING SAME

(71) Applicant: DOOSAN ENERBILITY CO., LTD, Changwon-si (KR)

(72) Inventor: Hyuk Hee Lee, Gimhae-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/528,300

(22) Filed: Dec. 4, 2023

(65) Prior Publication Data

US 2024/0191631 A1 Jun. 13, 2024

(30) Foreign Application Priority Data

Dec. 12, 2022 (KR) ........................ 10-2022-0172813

(51) Int. Cl.
*F01D 11/00* (2006.01)
*F01D 9/04* (2006.01)

(52) U.S. Cl.
CPC ............ *F01D 11/005* (2013.01); *F01D 9/042* (2013.01); *F01D 9/041* (2013.01);
(Continued)

(58) Field of Classification Search
CPC .......... F01D 11/005; F01D 9/04; F01D 9/041; F01D 9/042; F01D 11/08; F05D 2240/11
See application file for complete search history.

(56) References Cited

U.S. PATENT DOCUMENTS 4,524,980 A 6/1985 Lillibridge
4,557,412 A 12/1985 Lillibridge
(Continued)

FOREIGN PATENT DOCUMENTS

CN 102278147 A 12/2011
JP H10-252413 A 9/1998
(Continued)

OTHER PUBLICATIONS

English translation of JP2009203948A (Year: 2009).*
(Continued)

*Primary Examiner* — Woody A Lee, Jr.
*Assistant Examiner* — Esley Le Fisher
(74) *Attorney, Agent, or Firm* — Shook, Hardy & Bacon L.L.P.

(57) ABSTRACT

Proposed is a turbine vane platform sealing assembly in which compressed air is prevented from leaking to a turbine vane to improve power generation efficiency. The turbine vane platform sealing assembly includes a first sealing member inserted into a first groove formed in a turbine vane platform in a first direction, the first sealing member extending in the first direction, a second sealing member inserted into a second groove formed in a second direction intersecting the first direction of the turbine vane platform, with an end part of the second sealing member being in contact with an upper surface of the first sealing member, and the third sealing member having a portion formed by extending in the first direction and a remaining portion formed by bending in the second direction at a bend line at which the first sealing member and the second sealing member contact.

19 Claims, 12 Drawing Sheets

(52) U.S. Cl.
CPC ...... *F05D 2240/55* (2013.01); *F05D 2240/57* (2013.01); *F05D 2240/80* (2013.01)

(56) References Cited

U.S. PATENT DOCUMENTS 4,749,333 A 6/1988 Bonner et al.
5,154,577 A * 10/1992 Kellock ................ F01D 11/005 415/134
5,709,530 A 1/1998 Cahill
5,882,012 A 3/1999 Niwa
6,079,944 A 6/2000 Tomita
6,086,329 A 7/2000 Tomita et al.
6,162,014 A 12/2000 Bagepalli
6,315,301 B1 11/2001 Umemura
6,895,757 B2 5/2005 Mitchell
7,121,800 B2 10/2006 Beattie
7,261,514 B2 8/2007 London
8,011,892 B2 9/2011 Ramlogan
8,075,255 B2 12/2011 Morgan
8,182,208 B2 * 5/2012 Bridges, Jr. ............. F01D 9/041 277/630
8,240,985 B2 * 8/2012 Martin .................. F01D 11/005 415/173.1
8,398,090 B2 3/2013 McMahan et al.
8,579,580 B2 11/2013 Albers
8,672,626 B2 3/2014 Boy
8,727,710 B2 * 5/2014 Propheter-Hinckley ..................... F01D 11/005 415/139
9,200,519 B2 12/2015 Nereim
9,255,488 B2 2/2016 Szwedowicz et al.
9,732,620 B2 8/2017 Hough
9,810,086 B2 11/2017 Correia
9,863,257 B2 1/2018 Snyder
9,869,194 B2 1/2018 Dev et al.
9,874,102 B2 1/2018 Azad et al.
10,072,517 B2 * 9/2018 Boeke ..................... F01D 9/041
10,202,853 B2 2/2019 Kleinow
10,208,612 B2 2/2019 Olejarski
10,267,171 B2 4/2019 Dev
10,287,897 B2 5/2019 Paige et al.
10,323,531 B2 6/2019 Bluck et al.
10,557,366 B2 * 2/2020 Ciamarra ................ F01D 9/042
10,633,994 B2 4/2020 Barker
10,689,994 B2 6/2020 Albert
10,787,924 B2 * 9/2020 Quennehen ............ F16J 15/447
10,801,347 B2 10/2020 Joo
10,890,079 B2 * 1/2021 Propheter-Hinckley ..................... F16J 15/062
11,111,823 B2 * 9/2021 Jarrossay .............. F01D 11/005
11,187,094 B2 * 11/2021 Feldmann ................. F01D 9/02
11,215,063 B2 1/2022 Sarawate
11,506,085 B2 * 11/2022 Jarrossay .............. F01D 25/246
11,840,930 B2 12/2023 Propheter-Hinckley
2003/0039542 A1 2/2003 Cromer
2010/0247300 A1 9/2010 Morgan
2011/0262274 A1 10/2011 Boy
2014/0119899 A1 5/2014 Nereim
2014/0348642 A1 11/2014 Weber
2015/0056068 A1 2/2015 Weibe
2016/0222800 A1 8/2016 Kleinow
2017/0159478 A1 6/2017 Dev et al.
2017/0248024 A1 * 8/2017 Azad ....................... F01D 25/12
2019/0040758 A1 2/2019 Quennehen et al.
2019/0093493 A1 3/2019 Soda et al.
2019/0120073 A1 4/2019 Joo
2019/0203606 A1 7/2019 Sarawate
2021/0164366 A1 6/2021 Jarrossay
2021/0355844 A1 11/2021 Jarrossay
2022/0195893 A1 6/2022 Schiessl

FOREIGN PATENT DOCUMENTS

JP 34626952 B2 11/2003
JP 2009203948 A * 9/2009
JP 2010242748 A * 10/2010 ............ F01D 11/005
JP 2011032985 A 2/2011
JP 2012007607 A * 1/2012 ............ F01D 11/125
JP 2012149527 A * 8/2012
JP 2012-180830 A 9/2012
JP 2013-155680 A 8/2013
JP 2016094857 A * 5/2016
JP 2017-502195 A 1/2017
JP 6173811 B2 * 8/2017
JP 2017187025 A * 10/2017 ........... B65G 47/915
JP 6312929 B2 * 4/2018 ............. F01D 25/12
JP 6554882 B2 8/2019
JP 6673482 B2 3/2020
JP 2021099095 A 7/2021
JP 2021156286 A 10/2021
KR 2019-0044834 A 5/2019

OTHER PUBLICATIONS

English translation of JP-2010242748-A (Year: 2010).*
English translation of JP-2012007607-A (Year: 2012).*
English translation of JP-2012149527-A (Year: 2012).*
English translation of JP-2016094857-A (Year: 2016).*
English translation of JP-2017187025-A (Year: 2017).*
English translation of JP-6312929-B2 (Year: 2018).*
English translation of JP-6173811-B2 (Year: 2017).*

* cited by examiner

TURBINE VANE PLATFORM SEALING ASSEMBLY, AND TURBINE VANE AND GAS TURBINE INCLUDING SAME

CROSS REFERENCE TO RELATED APPLICATION

The present application claims priority to Korean Patent Application No. 10-2022-0172813, filed on Dec. 12, 2022, the entire contents of which are incorporated herein for all purposes by this reference.

BACKGROUND

1. Technical Field

The present disclosure relates to a turbine vane platform sealing assembly, and a turbine vane and a gas turbine each including the same.

2. Description of the Related Art

A turbine is a mechanical device that obtains a rotational force by an impulsive force or reaction force using a flow of a compressible fluid such as steam or gas. A turbine includes a steam turbine using a steam and a gas turbine using a high temperature combustion gas.

Among them, the gas turbine is mainly composed of a compressor, a combustor, and a turbine. The compressor is provided with an air inlet for introducing air, and a plurality of compressor vanes and compressor blades, which are alternately arranged in a compressor housing.

The combustor supplies fuel to the compressed air compressed in the compressor and ignites a fuel-air mixture with a burner to produce a high temperature and high pressure combustion gas.

The turbine has a plurality of turbine vanes and turbine blades disposed alternately in a turbine housing. Further, a rotor is arranged to pass through the center of the compressor, the combustor, the turbine and an exhaust chamber.

Both ends of the rotor are rotatably supported by bearings. A plurality of disks is fixed to the rotor so that the respective blades are connected and a drive shaft such as a generator is connected to an end of the exhaust chamber.

Since these gas turbines have no reciprocating mechanism such as a piston in a 4-stroke engine, so that there are no mutual frictional parts like piston-cylinder, the gas turbines have advantages in that consumption of lubricating oil is extremely small, amplitude as a characteristic of a reciprocating machine is greatly reduced, and high speed operation is possible.

Briefly describing the operation of the gas turbine, the compressed air in the compressor is mixed with fuel and combusted to produce a high-temperature combustion gas, which is then injected toward the turbine. The injected combustion gas passes through the turbine vanes and the turbine blades to generate a rotational force, which causes the rotor to rotate.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a turbine vane platform sealing assembly, and a turbine vane and a gas turbine including the same, in which low-temperature and high-pressure compressed air supplied to a turbine vane platform is prevented from leaking to the turbine vane through which high-temperature and low-pressure combustion gas flows so as to improve power generation efficiency.

In an embodiment of the present disclosure, there is provided a turbine vane platform sealing assembly including: a first sealing member inserted into a first groove formed in a turbine vane platform in a first direction, the first sealing member extending in the first direction; a second sealing member inserted into a second groove formed in a second direction intersecting the first direction of the turbine vane platform, with an end part of the second sealing member being in contact with an upper surface of the first sealing member, and a portion of a third sealing member being inserted into one side surface of the second sealing member; and the third sealing member having a portion formed by extending in the first direction and a remaining portion formed by bending in the second direction at a bend line at which the first sealing member and the second sealing member contact, with a third directional width of the third sealing member being greater than a third directional width of each of the first sealing member and the second sealing member.

In the turbine vane platform sealing assembly according to the embodiment of the present disclosure, the third sealing member may include: an extension part formed by extending up to the bend line in the first direction and disposed on an upper surface of the first sealing member, and a bent part formed by bending in the second direction at the bend line, wherein a third directional width of each of the extension part and the bent part may be greater than the width of each of the first sealing member and the second sealing member.

In the turbine vane platform sealing assembly according to the embodiment of the present disclosure, when the width of the first sealing member is a first width W1 and the width of the second sealing member is a second width W2, a third width W3 which is the width of the third sealing member may be greater than each of the first width and the second width and may be smaller than a sum of a gap G between any one turbine vane platform and an adjacent turbine vane platform and widths W4 of two first grooves formed in the any one turbine vane platform and the adjacent turbine vane platform.

In the turbine vane platform sealing assembly according to the embodiment of the present disclosure, at least a portion of the bent part of the third sealing member may be inserted into the second sealing member so that movement of the third sealing member is restricted.

In the turbine vane platform sealing assembly according to the embodiment of the present disclosure, the second sealing member may include: a plate-shaped sealing body formed with a first thickness; and a sealing head formed with a second thickness greater than the first thickness and having an insertion groove formed in a portion connecting with the sealing body.

In the turbine vane platform sealing assembly according to the embodiment of the present disclosure, the third sealing member may include: the extension part formed by extending in the first direction and disposed on the upper surface of the first sealing member; the bent part formed by bending in the second direction at a point at which the first sealing member and the second sealing member contact; and a protruding tab formed to protrude from an upper surface of the bent part and formed in a shape corresponding to the insertion groove.

In the turbine vane platform sealing assembly according to the embodiment of the present disclosure, a sum of the thickness of the sealing body and a thickness of the bent part may be the same as the second thickness of the sealing head.

In the turbine vane platform sealing assembly according to the embodiment of the present disclosure, the turbine vane platform may be at least one of a turbine vane outer platform coupled to the outer end of the turbine vane and a turbine vane inner platform coupled to the inner end of the turbine vane.

According to the embodiment of the present disclosure, the turbine vane which is fixedly mounted within a housing by the turbine vane outer platform coupled to the outer end thereof and the turbine vane inner platform coupled to the inner end thereof, wherein at least one of the turbine vane outer platform and the turbine vane inner platform includes the turbine vane platform sealing assembly. Here, the turbine vane platform sealing assembly includes: the first sealing member inserted into the first groove formed in a turbine vane platform in the first direction, the first sealing member extending in the first direction; the second sealing member inserted into the second groove formed in the second direction intersecting the first direction of the turbine vane platform, with an end part of the second sealing member being in contact with an upper surface of the first sealing member, and a portion of the third sealing member being inserted into one side surface of the second sealing member; and the third sealing member having a portion formed by extending in the first direction and a remaining portion formed by bending in the second direction at the bend line at which the first sealing member and the second sealing member contact, with a third directional width of the third sealing member being greater than a third directional width of each of the first sealing member and the second sealing member.

In the turbine vane according to the embodiment of the present disclosure, the third sealing member may include: the extension part formed by extending up to the bend line in the first direction and disposed on an upper surface of the first sealing member, and the bent part formed by bending in the second direction at the bend line, wherein a third directional width of each of the extension part and the bent part may be greater than the width of each of the first sealing member and the second sealing member.

In the turbine vane according to the embodiment of the present disclosure, when the width of the first sealing member is the first width W1 and the width of the second sealing member is the second width W2, the third width W3 which is the width of the third sealing member may be greater than each of the first width and the second width and may be smaller than a sum of a gap G between any one turbine vane platform and an adjacent turbine vane platform and the widths W4 of two first grooves formed in the any one turbine vane platform and the adjacent turbine vane platform.

In the turbine vane according to the embodiment of the present disclosure, at least a portion of the bent part of the third sealing member may be inserted into the second sealing member so that movement of the third sealing member is restricted.

In the turbine vane according to the embodiment of the present disclosure, the second sealing member may include: the plate-shaped sealing body formed with a first thickness; and the sealing head formed with a second thickness greater than the first thickness and having the insertion groove formed in a portion connecting with the sealing body.

In the turbine vane according to the embodiment of the present disclosure, the third sealing member may include: the extension part formed by extending in the first direction and disposed on the upper surface of the first sealing member; the bent part formed by bending in the second direction at a point at which the first sealing member and the second sealing member contact; and the protruding tab formed to protrude from an upper surface of the bent part and formed in a shape corresponding to the insertion groove.

In the turbine vane according to the embodiment of the present disclosure, the sum of the thickness of the sealing body and a thickness of the bent part may be the same as the second thickness of the sealing head.

A gas turbine according to the embodiment of the present disclosure includes: a compressor configured to suck and compress external air; a combustor configured to mix fuel with air compressed in the compressor and combust a mixture of the fuel and the compressed air; and a turbine having turbine blades and turbine vanes mounted therein, the turbine blades being rotated by combustion gas discharged from the combustor. Here, each of the turbine vanes is fixedly mounted within the housing by the turbine vane outer platform coupled to the outer end thereof and the turbine vane inner platform coupled to the inner end thereof, wherein at least one of the turbine vane outer platform and the turbine vane inner platform includes the turbine vane platform sealing assembly. Here, the turbine vane platform sealing assembly includes: the first sealing member inserted into the first groove formed in the turbine vane platform in the first direction, the first sealing member extending in the first direction; the second sealing member inserted into the second groove formed in the second direction intersecting the first direction of the turbine vane platform, with an end part of the second sealing member being in contact with an upper surface of the first sealing member, and a portion of the third sealing member being inserted into one side surface of the second sealing member; and the third sealing member having a portion formed by extending in the first direction and a remaining portion formed by bending in the second direction at the bend line at which the first sealing member and the second sealing member contact, with a third directional width of the third sealing member being greater than a third directional width of each of the first sealing member and the second sealing member.

In the gas turbine according to the embodiment of the present disclosure, the third sealing member may include: the extension part formed by extending up to the bend line in the first direction and disposed on an upper surface of the first sealing member, and the bent part formed by bending in the second direction at the bend line, wherein a third directional width of each of the extension part and the bent part may be greater than the width of each of the first sealing member and the second sealing member.

In the gas turbine according to the embodiment of the present disclosure, when the width of the first sealing member is the first width W1 and the width of the second sealing member is the second width W2, the third width W3 which is the width of the third sealing member may be greater than each of the first width and the second width and may be smaller than a sum of a gap G between any one turbine vane platform and an adjacent turbine vane platform and the widths W4 of two first grooves formed in the any one turbine vane platform and the adjacent turbine vane platform.

In the gas turbine according to the embodiment of the present disclosure, at least a portion of the bent part of the third sealing member may be inserted into the second sealing member so that movement of the third sealing member is restricted.

In the gas turbine according to the embodiment of the present disclosure, the second sealing member may include: the plate-shaped sealing body formed with a first thickness, and the sealing head formed with a second thickness greater than the first thickness and having the insertion groove formed in a portion connecting with the sealing body.

In the gas turbine according to the embodiment of the present disclosure, the third sealing member may include: the extension part formed by extending in the first direction and disposed on the upper surface of the first sealing member; the bent part formed by bending in the second direction at a point at which the first sealing member and the second sealing member contact; and the protruding tab formed to protrude from an upper surface of the bent part and formed in a shape corresponding to the insertion groove.

In the gas turbine according to the embodiment of the present disclosure, the sum of the thickness of the sealing body and a thickness of the bent part may be the same as the second thickness of the sealing head.

According to the embodiment of the present disclosure, low-temperature and high-pressure compressed air supplied to the turbine vane platform is prevented from leaking to the turbine vane through which high-temperature and low-pressure combustion gas flows so as to improve power generation efficiency.

DETAILED DESCRIPTION

Figure 1:
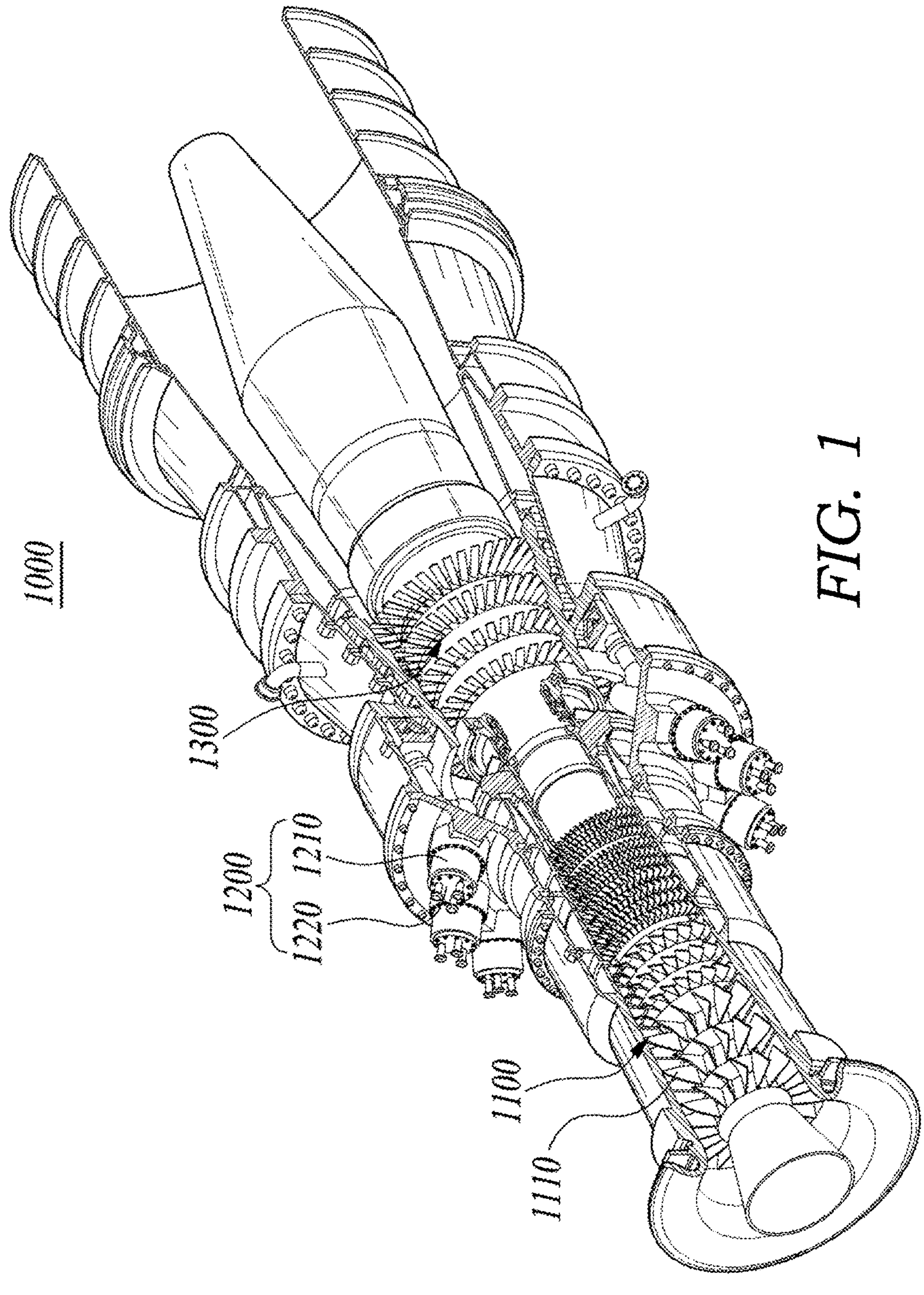
FIG. 1 is a partially cut-away perspective view of a gas turbine according to an embodiment of the present disclosure.

Hereinafter, exemplary embodiments of the present disclosure will be described in detail with reference to the accompanying drawings. However, it should be noted that the present disclosure is not limited thereto, and may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 2:
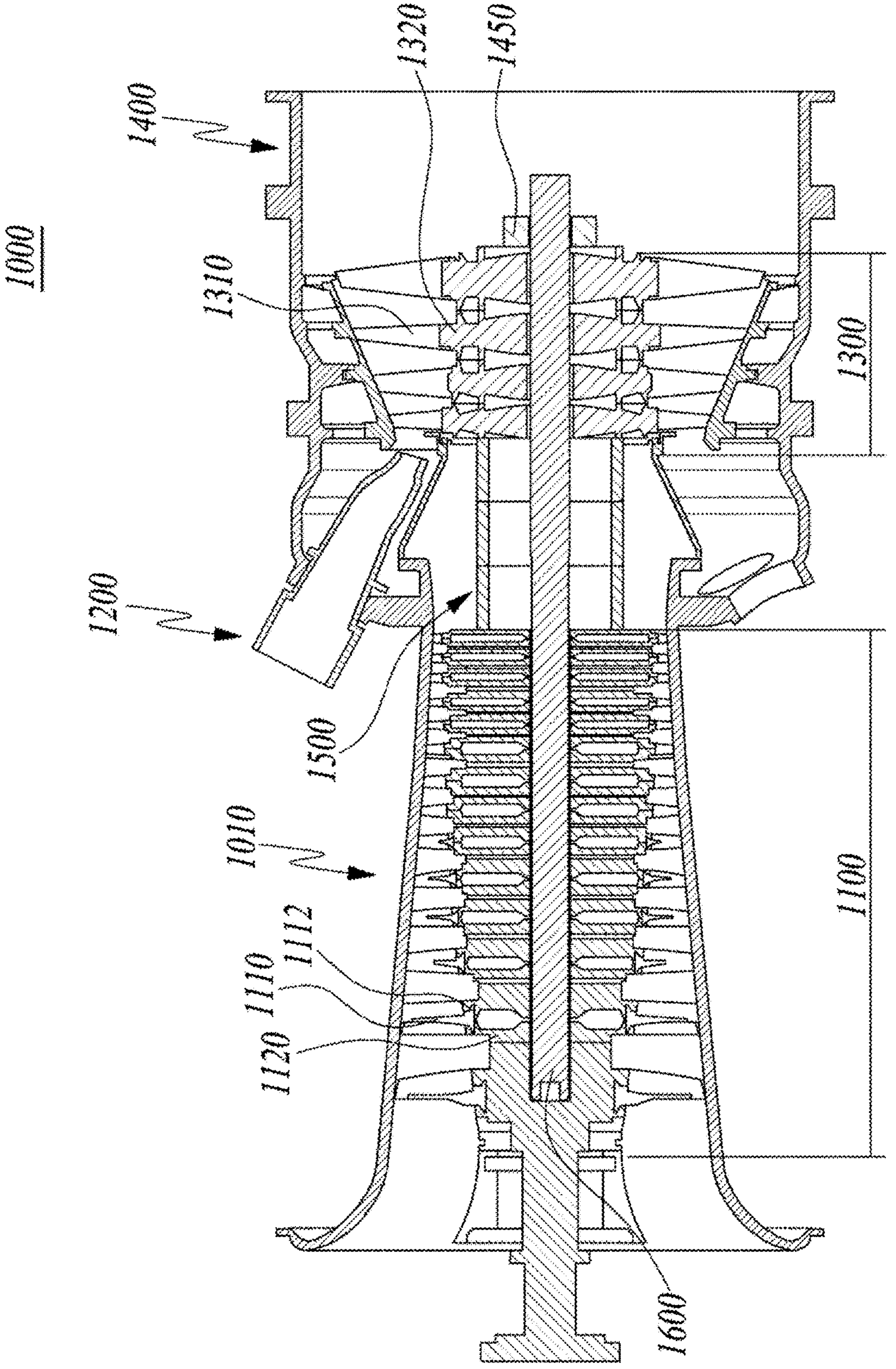
FIG. 2 is a cross-sectional view illustrating a schematic structure of the gas turbine according to the embodiment of the present disclosure.
Figure 3:
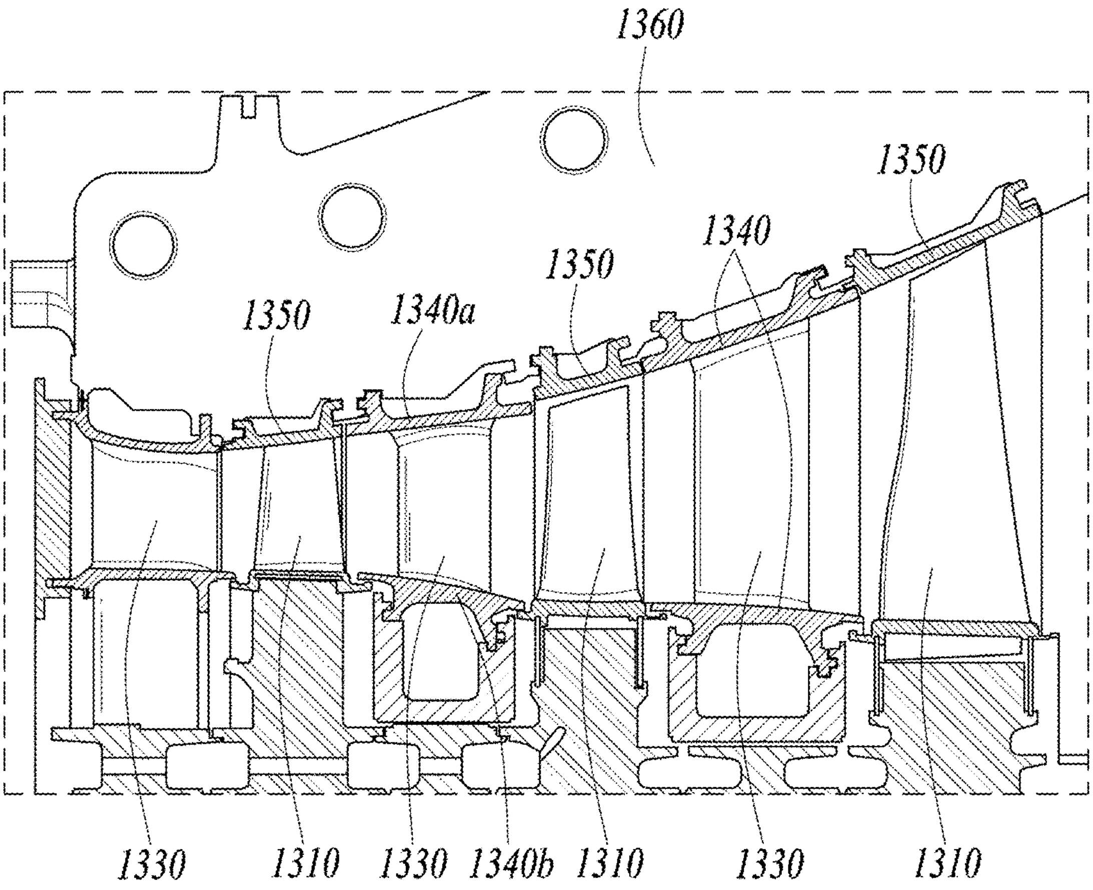
FIG. 3 is a partial cross-sectional view illustrating an internal structure of the gas turbine according to the embodiment of the present disclosure.

FIG. 1 is a partially cut-away perspective view of a gas turbine according to an embodiment of the present disclosure, FIG. 2 is a cross-sectional view illustrating a schematic structure of the gas turbine according to the embodiment of the present disclosure, and FIG. 3 is a partial cross-sectional view illustrating an internal structure of the gas turbine according to the embodiment of the present disclosure.

As illustrated in FIG. 1, a gas turbine 1000 according to the embodiment of the present disclosure includes a compressor 1100, a combustor 1200, and a turbine 1300. The compressor 1100 includes a plurality of blades 1110 radially installed. The compressor 1100 rotates each of the blades 1110 so that air flows while being compressed by the rotation of the blades 1110. The size and installation angle of the blade 1110 may vary depending on the installation location. In the embodiment, the compressor 1100 is connected directly or indirectly to the turbine 1300, and receives a portion of the power generated from the turbine 1300 to rotate the blade 1110.

Air compressed by the compressor 1100 flows to the combustor 1200. The combustor 1200 includes a plurality of combustion chambers 1210 and a fuel nozzle module 1220 arranged in an annular shape.

As illustrated in FIG. 2, the gas turbine 1000 according to the embodiment of the present disclosure includes a housing 1010 and a diffuser 1400 which is disposed on a rear side of the housing 1010 and through which a combustion gas passing through a turbine 1300 is discharged. In addition, the combustor 1200 is disposed in front of the diffuser 1400 so as to receive and burn compressed air.

Referring to the flow direction of the air, a compressor 1100 is located on the upstream side of the housing 1010, and a turbine 1300 is located on the downstream side of the housing 1010. In addition, a torque tube 1500 is disposed as a torque transmission member between the compressor 1100 and the turbine 1300 to transmit the rotational torque generated in the turbine to the compressor 1100.

The compressor 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of blades 1110 are radially coupled to an outer circumferential surface of the compressor rotor disk 1120. Each of the blades 1110 has a dovetail part 1112 which is fastened to the compressor rotor disk 1120.

Vanes (not shown) fixed to the housing are respectively positioned between the rotor disks 1120. Unlike the rotor disks, the vanes are fixed to the housing and do not rotate. The vane serves to align a flow of compressed air that has passed through the blades 1110 of the compressor rotor disk 1120 and guide the air to the blades 1110 of the rotor disk 1120 located on the downstream side.

The fastening method of the dovetail part 1112 includes a tangential type and an axial type. These may be chosen according to the required structure of the commercial gas turbine, and may have a generally known dovetail or fir-tree shape. In some cases, it is possible to fasten the blades to the rotor disk by using other fasteners such as keys or bolts in addition to the fastening shape.

The tie rod 1600 is arranged to pass through the center of the compressor rotor disks 1120 and turbine rotor disks 1320 such that one end thereof is fastened in the compressor rotor disk located on the most upstream side and the other end thereof is fastened by a fixing nut 1450, wherein the tie rod 1600 may be composed of a single tie rod or a plurality of tie rods.

The shape of the tie rod 1600 is not limited to that shown in FIG. 2, but may have a variety of structures depending on the gas turbine. That is, as shown in the drawing, one tie rod may have a shape passing through a central portion of the rotor disk, a plurality of tie rods may be arranged in a circumferential manner, or a combination thereof may be used.

Although not shown, the compressor 1100 of the gas turbine 1000 may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-pressure combustion gas with high energy. With an isobaric combustion process in the compressor, the temperature of the combustion gas is increased to the heat resistance limit that the combustor and the turbine components can withstand.

The combustor consists of a plurality of combustors, which is arranged in the housing formed in a cell shape, and includes a burner having a fuel injection nozzle and the like, a combustor liner forming a combustion chamber, and a transition piece as a connection between the combustor and the turbine, thereby constituting a combustion system of the gas turbine.

Specifically, the combustor liner provides a combustion space in which the fuel injected by the fuel nozzle is mixed with the compressed air of the compressor and the fuel-air mixture is combusted. Such a liner may include a flame canister providing the combustion space in which the fuel-air mixture is combusted, and a flow sleeve forming an annular space by surrounding the flame canister. A fuel nozzle is coupled to the front end of the liner, and an igniter plug is coupled to the side wall of the liner.

Meanwhile, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The combustion gas expands and collides with and provides a reaction force to rotating blades of the turbine 1300 to cause a rotational torque, which is then transmitted to the compressor 1100 through the torque tube 1500. Here, an excess of power required to drive the compressor 1100 is used to drive a generator or the like.

The turbine 1300 is basically similar in structure to the compressor 1100. That is, the turbine 1300 is also provided with a plurality of turbine rotor disks 1320 similar to the compressor rotor disks 1120 of the compressor 1100. Thus, the turbine rotor disk 1320 also includes a plurality of turbine blades 1310 disposed radially. The turbine blade 1310 may also be coupled to the turbine rotor disk 1320 in a dovetail coupling manner, for example. Between the blades 1310 of the turbine rotor disk 1320, a turbine vane 1330 fixed to the housing is provided to guide a flow direction of the combustion gas passing through the blades.

The turbine vane 1330 is fixedly mounted within the housing by a turbine vane platform 1340 (1340*a* and 1340*b*) coupled to inner and outer ends of the turbine vane 1330. The turbine vane platform coupled to the outer end is a turbine vane outer platform 1340*a*, and the turbine vane platform coupled to the inner end is a turbine vane inner platform 1340*b*. In a position facing the outer end of the turbine blade 1310 rotating on the inner side of the housing, a ring segment 1350 is mounted to form a predetermined gap with the outer end of the turbine blade 1310.

Figure 4:
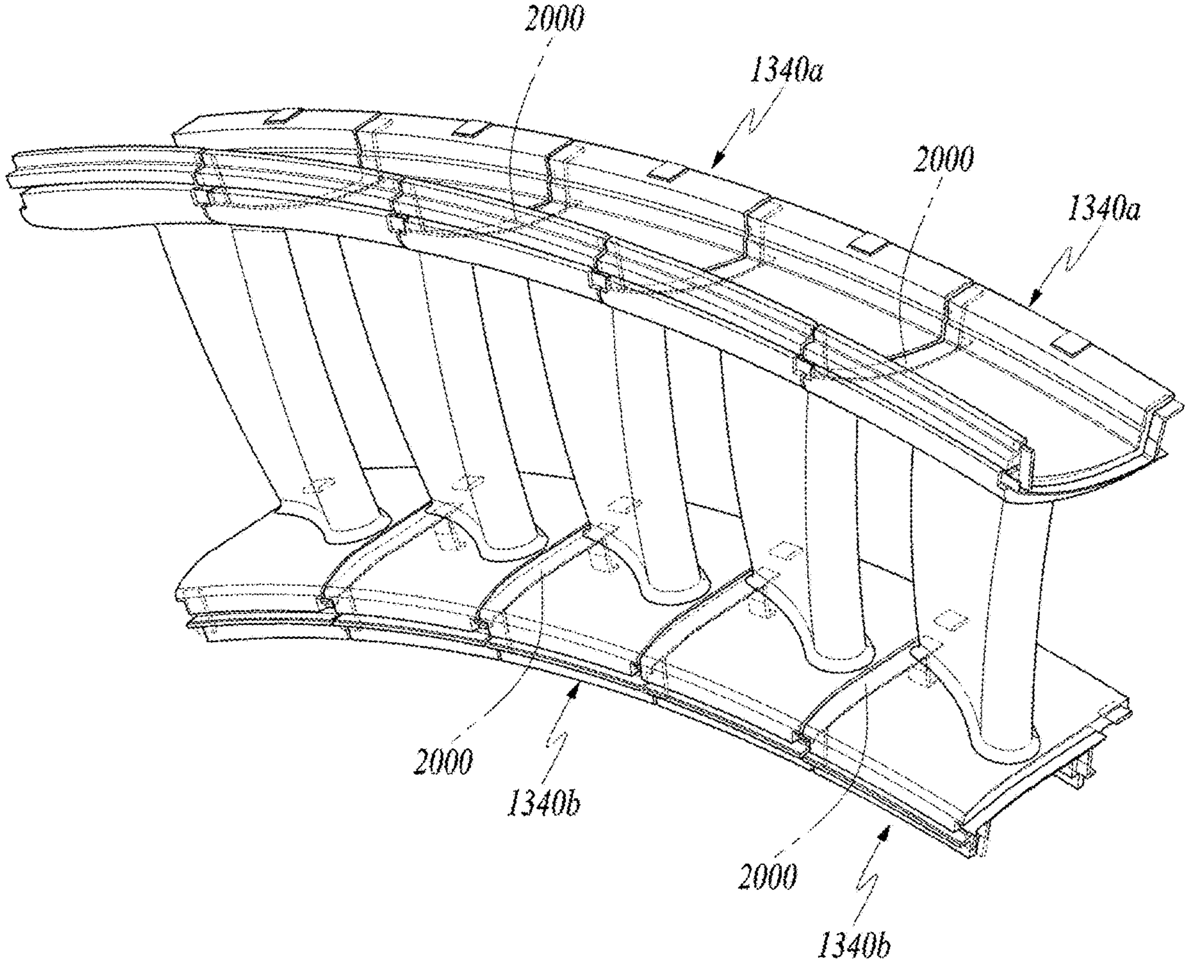
FIG. 4 is a perspective view illustrating a state in which a turbine vane platform sealing assembly according to the embodiment of the present disclosure is installed in the turbine vane platform.

High-temperature and high-pressure combustion gases supplied from the combustor 1200 flow in the turbine vane 1330, and the turbine vane platform 1340 (1340*a*, 1340*b*) is cooled by low-temperature and high-pressure compressed air supplied from the compressor 1100. At this time, if the low-temperature and high-pressure compressed air supplied to the turbine vane platform 1340 leaks toward the turbine vane 1330 where the high-temperature and high-pressure combustion gases flow, power generation efficiency will decrease. To prevent such gas leakage, a turbine vane platform sealing assembly 2000 according to the embodiment of the present disclosure as illustrated in FIG. 4 is installed on the turbine vane platform 1340.

The turbine vane platform sealing assembly 2000 is laterally (circumferentially) inserted between a groove formed in any one turbine vane platform 1340 and a groove formed in an adjacent turbine vane platform 1340 and prevents low-temperature and high-pressure compressed air from leaking toward the turbine vane 1330 through a gap between the any one turbine vane platform 1340 and the adjacent turbine vane platform 1340. This will be described in detail with reference to FIGS. 5 to 10.

Figure 5:
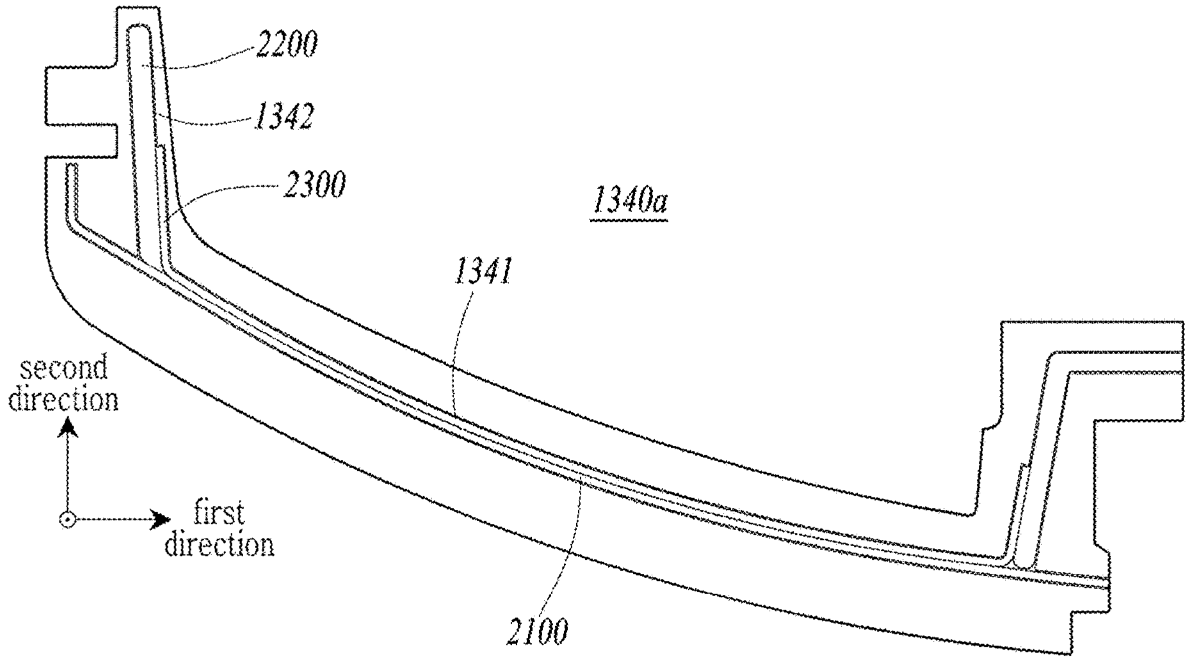
FIG. 5 is a cross-sectional view illustrating a state in which the turbine vane platform sealing assembly according to the embodiment of the present disclosure is installed in a turbine vane outer platform.
Figure 6:
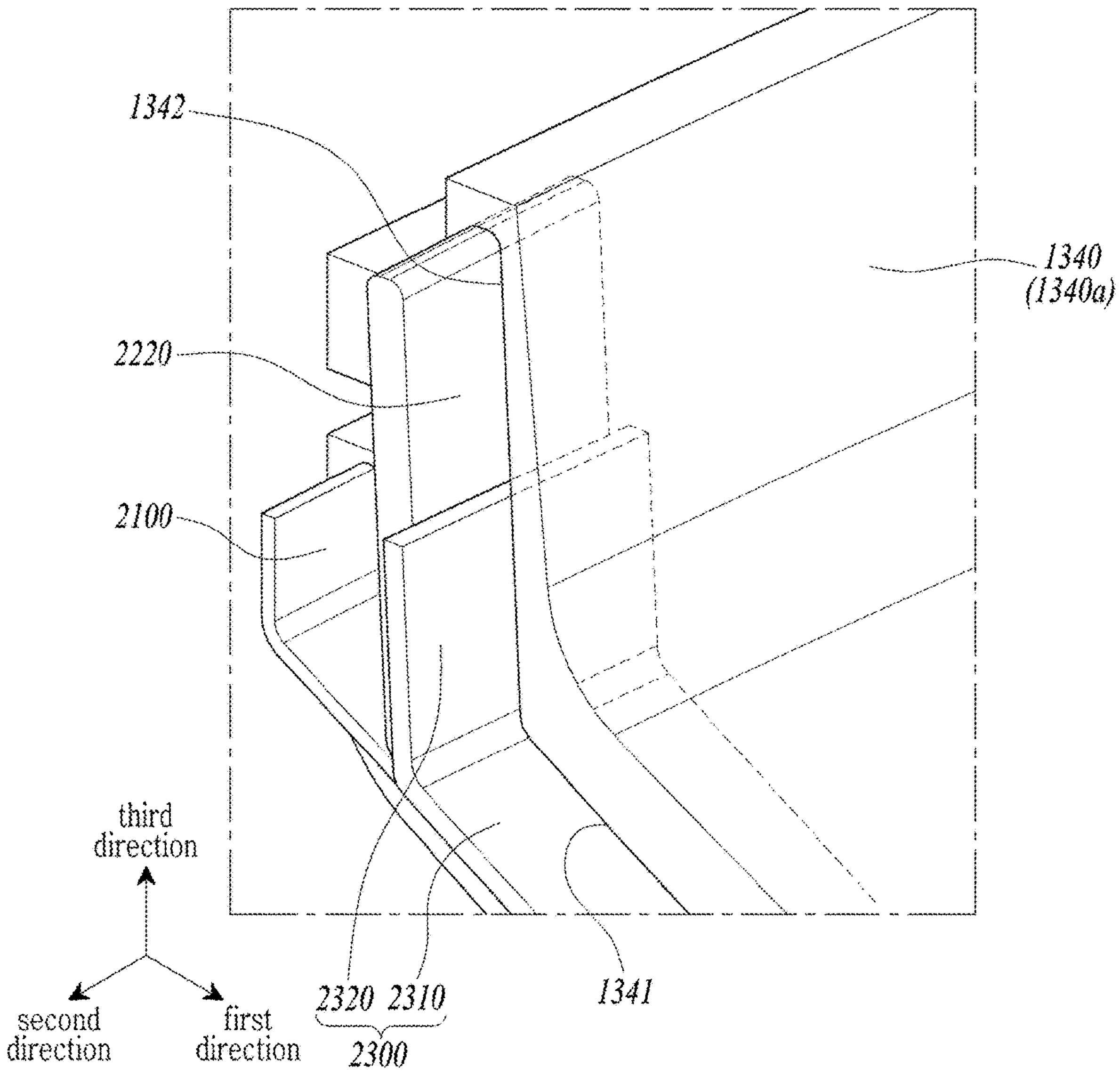
FIG. 6 is a perspective view illustrating the turbine vane platform sealing assembly according to the embodiment of the present disclosure.
Figure 7:
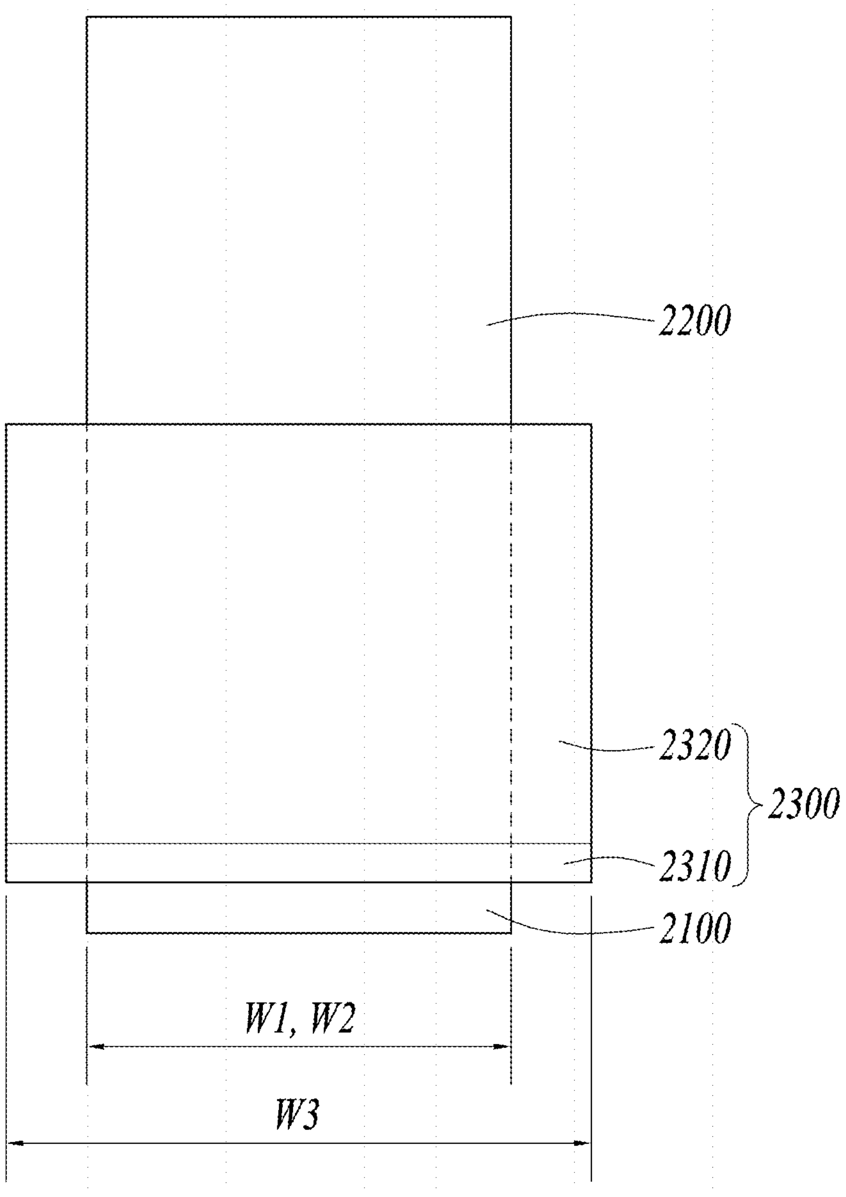
FIG. 7 is a front view illustrating the turbine vane platform sealing assembly according to the embodiment of the present disclosure.
Figure 8:
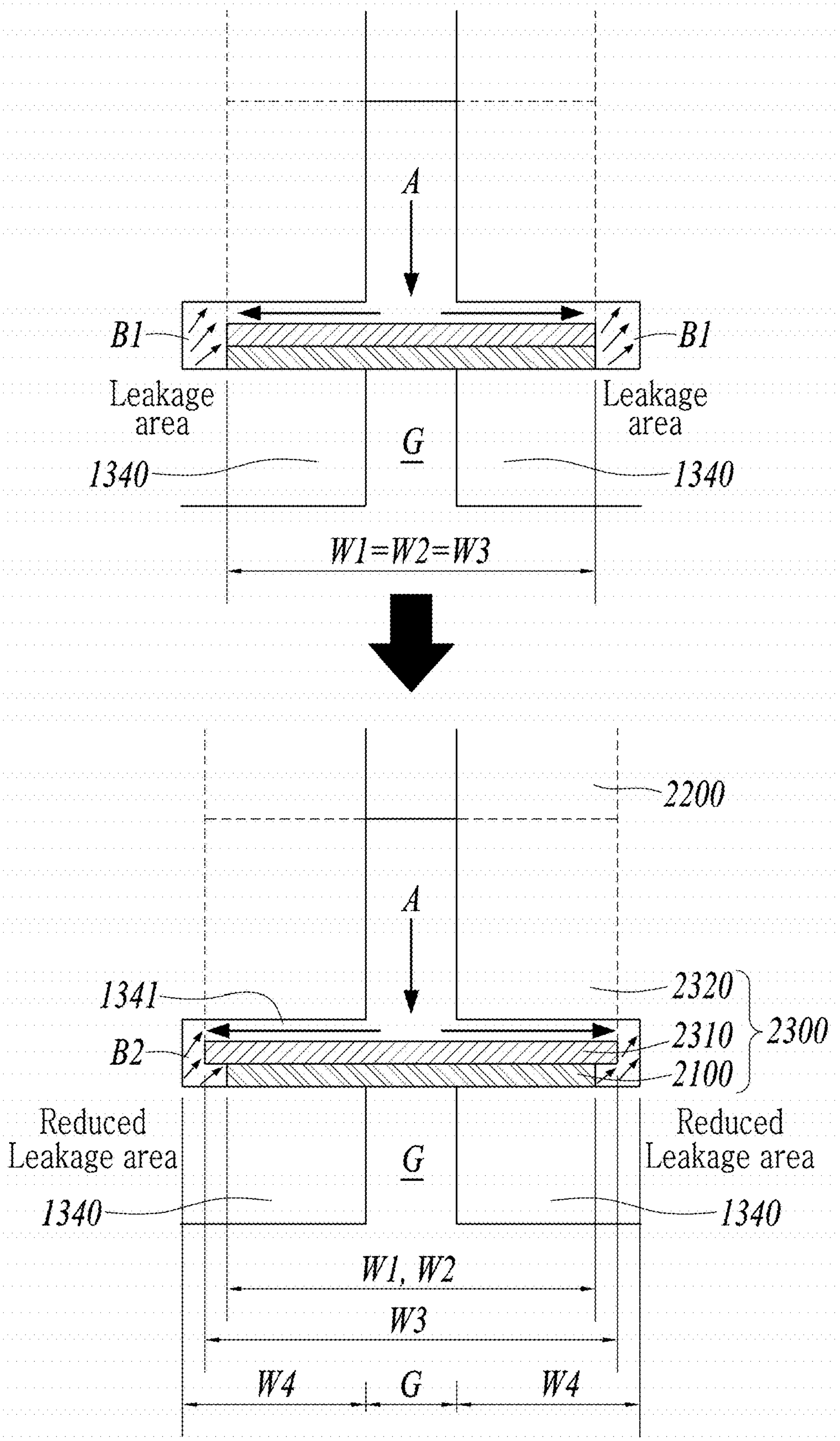
FIG. 8 is a view illustrating the flow of compressed air in a state in which the turbine vane platform sealing assembly according to the embodiment of the present disclosure is mounted.
Figure 9:
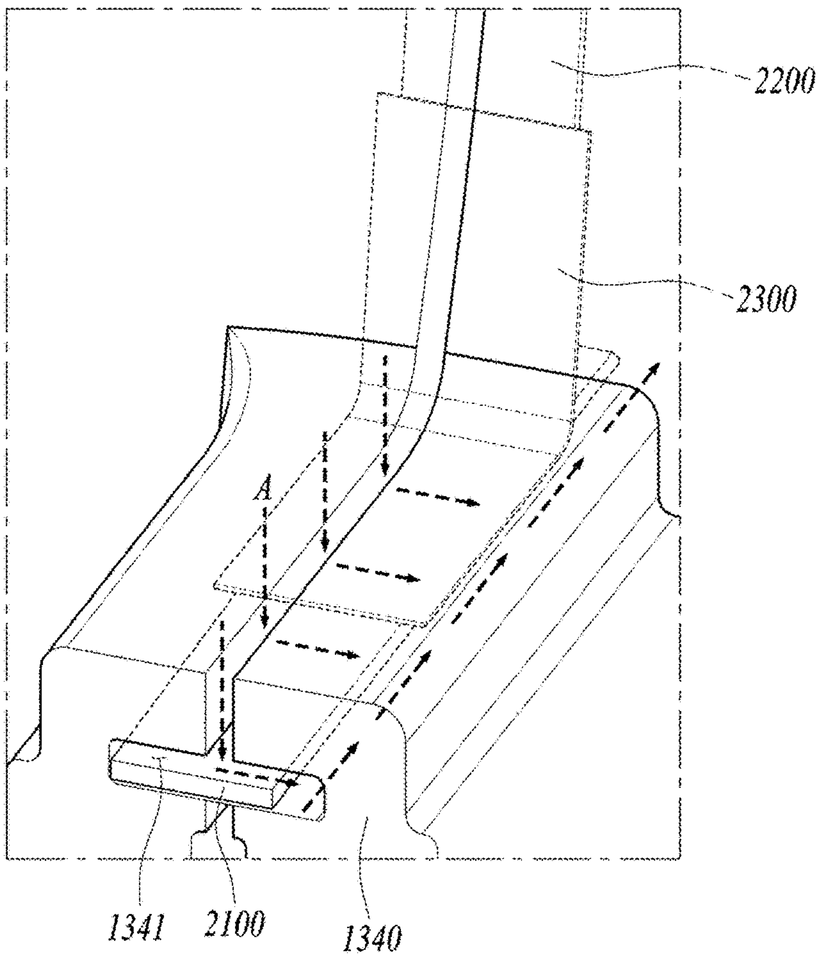
FIG. 9 is a view illustrating the flow of compressed air in a state in which the turbine vane platform sealing assembly according to the embodiment of the present disclosure is mounted.

FIG. 5 is a cross-sectional view illustrating a state in which the turbine vane platform sealing assembly according to the embodiment of the present disclosure is installed in a turbine vane outer platform; FIG. 6 is a perspective view illustrating the turbine vane platform sealing assembly according to the embodiment of the present disclosure; FIG. 7 is a front view illustrating the turbine vane platform sealing assembly according to the embodiment of the present disclosure; FIGS. 8 and 9 are views illustrating the flow of compressed air in a state in which the turbine vane platform sealing assembly according to the embodiment of the present disclosure is mounted; and FIG. 10 is a cross-sectional view illustrating a turbine vane platform sealing assembly installed on a turbine vane inner platform according to the embodiment of the present disclosure.

Figure 10:
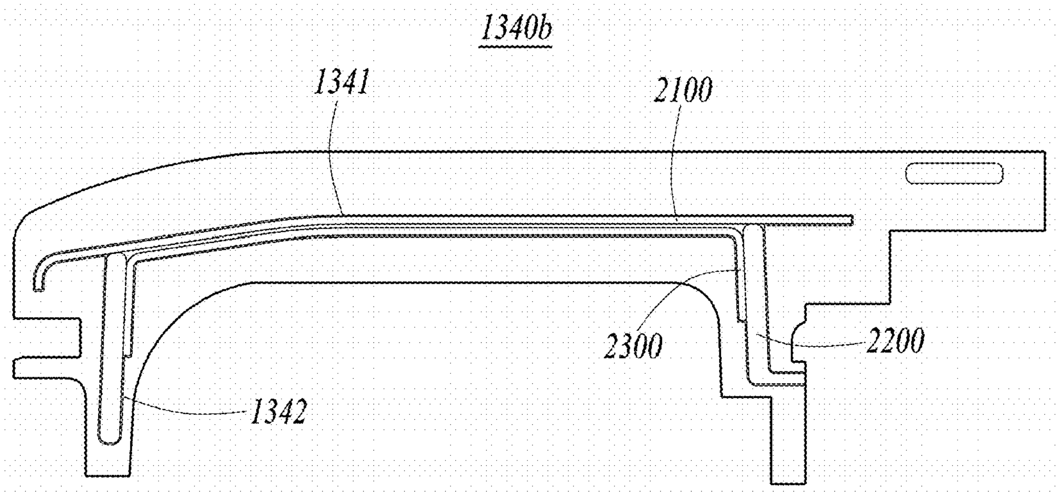
FIG. 10 is a cross-sectional view illustrating a turbine vane platform sealing assembly installed on a turbine vane inner platform according to the embodiment of the present disclosure.

Referring to FIGS. 5 to 10, the turbine vane platform sealing assembly 2000 according to the embodiment of the present disclosure includes a first sealing member 2100, a second sealing member 2200, and a third sealing member 2300. Although the turbine vane platform sealing assembly 2000 is illustrated in FIG. 5 as being inserted between adjacent turbine vane outer platforms **1340*a* and 1340*a*, as illustrated in FIGS. 4 and 10, the turbine vane platform sealing assembly 2000 may be inserted between adjacent turbine vane inner platforms 1340*b* as well as between adjacent turbine vane outer platforms 1340*a*. Hereinafter, the turbine vane outer platform 1340*a* and the turbine vane inner platform 1340*b* are collectively referred to as the turbine vane platform 1340, and like reference numerals are used for the turbine vane outer platform 1340*a* and the turbine vane inner platform 1340*b***.

The first sealing member 2100 is inserted into a first groove 1341 formed in a first direction of the turbine vane platform 1340. To this end, the first sealing member 2100 is formed by extending in the first direction. The first direction may be an axial direction of a gas turbine (tie rod direction). The first sealing member 2100 is formed in a shape corresponding to the shape of the first groove 1341.

The second sealing member 2200 is inserted into a second groove 1342 formed in the second direction intersecting the first direction. To this end, the second sealing member 2200 is formed by extending in the second direction. The second direction may be a radial direction with respect to the axis of the gas turbine. The second sealing member 2200 is formed in a shape corresponding to the shape of the second groove 1342. While assembled, the end part of the second sealing member 2200 contacts with and is fixed to the upper surface of the first sealing member 2100.

The third sealing member 2300 includes an extension part 2310 and a bent part 2320. The extension part 2310 extends up to a bend line in the first direction on the upper surface of the first sealing member 2100 and is disposed on the upper surface of the first sealing member 2100. The bent part 2320 is formed by bending the second direction at a point (referred to as the bend line) at which the first sealing member 2100 and the second sealing member 2200 contact, and is disposed on a side surface of the second sealing member 2200.

In this case, a third directional width of the third sealing member 2300 in is preferably greater than a third directional width of each of the first sealing member 2100 and the second sealing member 2200. The third direction is a circumferential direction with respect to the axis of the gas turbine.

Specifically, when the width of the first sealing member 2100 is formed as a first width W1 and the width of the second sealing member 2200 is formed as a second width W2, the width of the third sealing member 2300 is preferably formed as a third width W3, which is larger than each of the first width W1 and the second width W2. At this time, the first width W1 and the second width W2 may be the same or different.

More specifically, the third width W3 is greater than each of the first width W1 and the second width W2, and is smaller than the sum of a gap G (see FIG. 8) between one turbine vane platform 1340 and an adjacent turbine vane platform 1340 and the widths W4 of two first grooves 1341 formed in the one turbine vane platform 1340 and the adjacent turbine vane platform 1340. That is, the size of the third width W3 is preferably represented as (W1 or W2)<W3<(2*W4+G).

Meanwhile, the gap G is largest when the gas turbine is stopped, and may become smaller due to centrifugal force and thermal expansion, etc. during the operation of the gas turbine. Accordingly, in consideration of the minimum gap G during the operation of the gas turbine, the width W3 of the third sealing member 2300 is preferably smaller than the sum of the gap G and the widths of the two first grooves 1341. The minimum gap G may vary depending on the type of gas turbine and may be determined through repeated test runs on a gas turbine prototype to be installed.

When the vane platform sealing assembly 2000 configured as described above is mounted between the turbine vane platforms 1340, it is possible to prevent low-temperature and high-pressure compressed air supplied to the turbine vane platform 1340 from leaking toward the turbine vane 1330 through which high-temperature and high-pressure combustion gas flows.

Meanwhile, a relationship between the sizes of the widths of the first to third sealing members and the amount of compressed air leakage will be described with reference to FIG. 8. The upper side of FIG. 8 illustrates a case in which the widths of the first to third sealing members are the same (W1=W2=W3), and the lower side of FIG. 8 illustrates a case in which the widths of the first and second sealing members are the same and the width of the third sealing member is greater than each of the widths of the first and second sealing members (W1=W2<W3).

In consideration of centrifugal force and thermal expansion during the operation of the gas turbine, the gap G is designed to be formed between one turbine vane platform 1340 and an adjacent turbine vane platform 1340, and a certain amount of compressed air A supplied to the upper part of the turbine vane platform 1340 leaks to the turbine vane 1330 through the first groove 1341 and a leakage area B1 formed by the turbine vane platform sealing assembly 2000.

At this time, as illustrated in the upper side of FIG. 8, when the widths of the first to third sealing members are the same (W1=W2=W3), the volume of the leakage area B1 is large, and as a result, the amount of compressed air leaking through the leakage area B1 increases. The leaked compressed air mixes with combustion gas flowing through the turbine vane 1330, thereby reducing overall power generation efficiency.

On the other hand, as illustrated in the lower side of FIG. 8, when the widths of the first and second sealing members are the same and the width of the third sealing member is greater than each of the widths of the first and second sealing members (W1=W2<W3), the volume of a leakage area B2 is relatively small, and as a result, the amount of compressed air leaking through the leakage area B2 decreases, thereby improving overall power generation efficiency.

Meanwhile, in FIG. 8, the directions of arrows shown in the leakage area B1 and the leakage area B2 are directed toward the ground, and sizes thereof indicate the amount of leakage.

Figure 11:
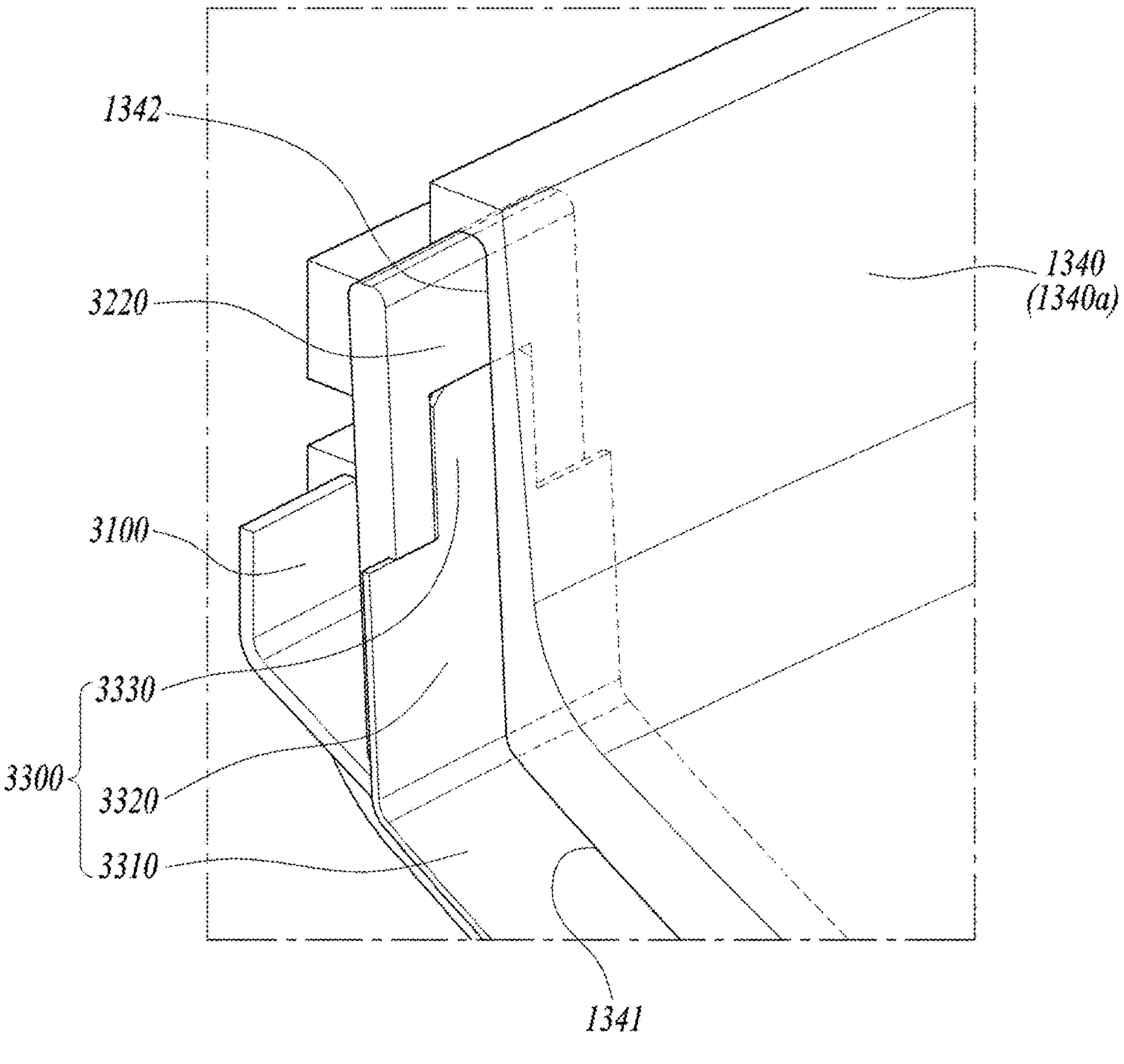
FIG. 11 is a perspective view illustrating a turbine vane platform sealing assembly according to another embodiment of the present disclosure.
Figure 12:
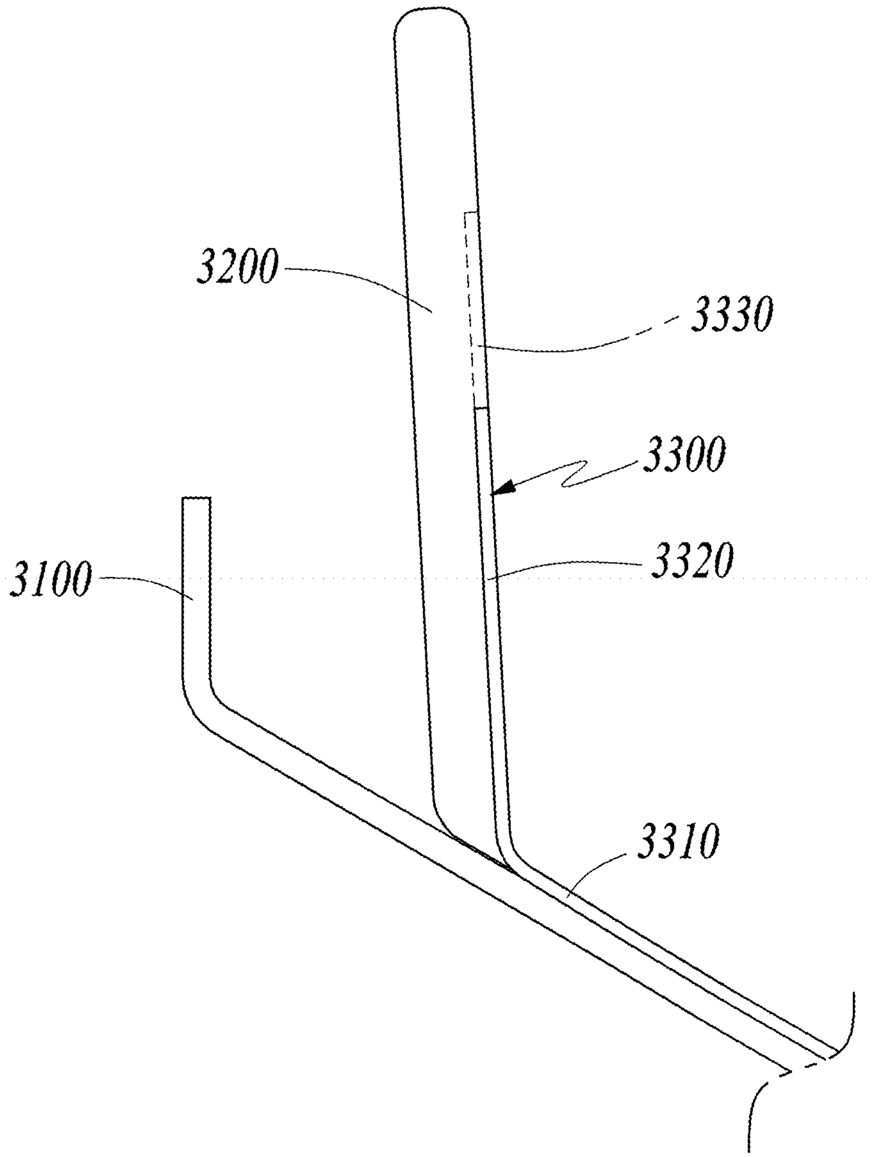
FIG. 12 is a side view illustrating the turbine vane platform sealing assembly according to the another embodiment of the present disclosure.

Next, a turbine vane platform sealing assembly according to another embodiment of the present disclosure will be described with reference to FIGS. 11 to 13. FIG. 11 is a perspective view illustrating a turbine vane platform sealing assembly according to the another embodiment of the present disclosure; FIG. 12 is a side view illustrating the turbine vane platform sealing assembly according to the another embodiment of the present disclosure; and FIG. 13 is a perspective view illustrating a second sealing member and a third sealing member of the turbine vane platform sealing assembly according to the another embodiment of the present disclosure.

In the turbine vane platform sealing assembly 2000 according to the above-described embodiment, the first sealing member 2100, the second sealing member 2200, and the third sealing member 2300 are simply placed on one another in a sliding manner, so that the second sealing member 2200 and the third sealing member 2300 may be accidently detached when the turbine vane platforms 1340 are removed during gas turbine maintenance, thereby reducing the stability and ease of operation.

Accordingly, in the another embodiment, the present disclosure proposes a turbine vane platform sealing assembly that can prevent the accidental detachment from the turbine vane platform 1340, thereby improving the stability and ease of operation during gas turbine maintenance.

Figure 13:
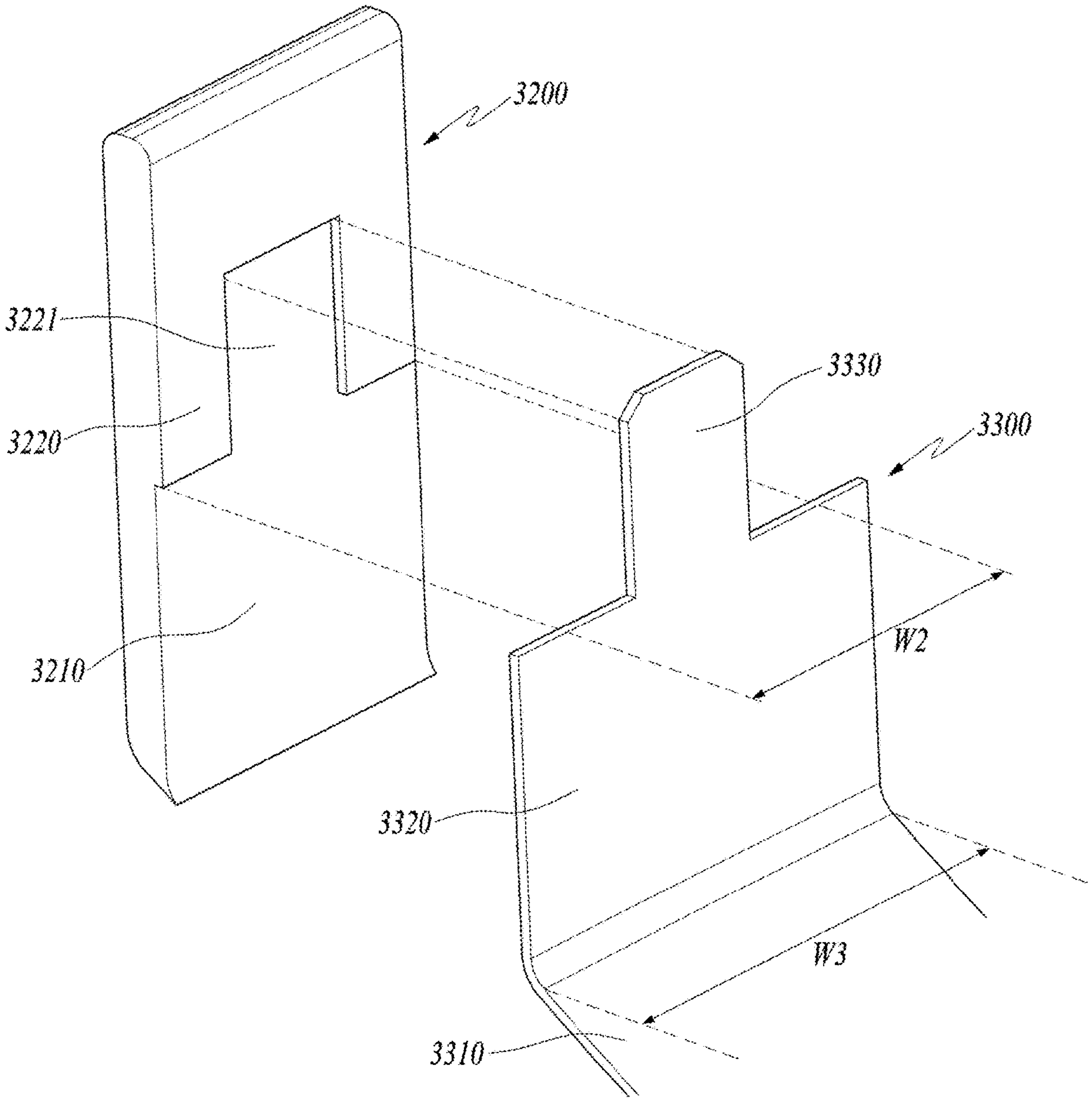
FIG. 13 is a perspective view illustrating a second sealing member and a third sealing member of the turbine vane platform sealing assembly according to the another embodiment of the present disclosure.

Referring to FIGS. 11 to 13, a turbine vane platform sealing assembly 3000 according to the another embodiment of the present disclosure includes a first sealing member 3100, a second sealing member 3200, and a third sealing member 3300.

The first sealing member 3100 is inserted into the first groove 1341 formed in the turbine vane platform 1340 in the first direction. To this end, the first sealing member 3100 is formed by extending in the first direction. The first direction may be the axial direction of the gas turbine (a tie rod direction). The first sealing member 3100 is formed in a shape corresponding to the shape of the first groove 1341.

The second sealing member 3200 is inserted into the second groove 1342 formed in the second direction intersecting the first direction. To this end, the second sealing member 3200 is formed by extending in the second direction. The second direction may be a radial direction with respect to the axis of the gas turbine. The second sealing member 3200 is formed in a shape corresponding to the shape of the second groove 1342.

An end of the second sealing member 3200 fixedly contacts an upper surface of the first sealing member 3100. Further, one side of the second sealing member 3200 is formed such that a portion of the third sealing member 3300 may be inserted and coupled thereto.

The second sealing member 3200 has one side surface formed so that a portion of the third sealing member 3300 can be inserted and coupled thereto.

The second sealing member 3200 includes a sealing body 3210 and a sealing head 3220. The sealing body 3210 is a plate-shaped metal member formed with a first thickness, and is a portion on which a bent part 3320 of the third sealing member 3300 to be described later is disposed. The sealing head 3220 is formed with a second thickness greater than the first thickness, and has an insertion groove 3221 at a portion that connects with the sealing body 3210 such that a protruding tab 3330 of the third sealing member 3300 is inserted into the insertion groove.

The third sealing member 3300 is bent so that a portion of the third sealing member is disposed on the upper surface of the first sealing member 3100 and a portion of the third sealing member is coupled to the second sealing member 3200, thereby limiting circumferential movement of the third sealing member. To this end, the third sealing member 3300 includes an extension part 3310, the bent part 3320, and the protruding tab 3330.

The extension part 3310 is a part that extends in the first direction and is disposed on the upper surface of the first sealing member 3100. The bent part 3320 is a part that is formed by bending in the second direction at a point where the first sealing member 3100 and the second sealing member 3200 are in contact (referred to as a bend line). The sum of the thickness of the sealing body 3210 and the thickness of the bent part 3320 becomes the second thickness, which is the thickness of the sealing head 3220, and when the bent part 3320 is disposed on the sealing body 3210, there is no step between the bent part 3320 and the sealing head 3220 to facilitate assembly and disassembly.

The protruding tab 3330 is a tab formed to protrude from an upper surface of the bent part 3320 in a shape corresponding to the insertion groove 3221.

The extension part 3310 extends from the upper surface of the first sealing member 3100 to the bend line in the first direction, the bent part 3320 is disposed on the sealing body 3210, and the protruding tab 3330 is inserted into the insertion groove 3221 of the sealing head 3220, so that, as a whole, the third sealing member 3300 is coupled to the second sealing member 3200 to limit its circumferential movement.

At this time, each of the third directional widths of the extension part 3310 and the bent part 3320 of the third sealing member 3300 is preferably greater than each of the widths of the first sealing member 3100 and the second sealing member 3200. The third direction is a circumferential direction with respect to the axis of the gas turbine.

Specifically, when the width of the first sealing member 3100 is formed as a first width W1, and the width of the second sealing member 3200 is formed as a second width W2, the width of each of the extension part 3310 and the bent part 3320 is preferably formed to have a third width W3 greater than each of the first width and the second width. At this time, the first width and the second width may be the same or different.

More specifically, the third width W3 is greater than the first width W1 and the second width W2, and is smaller than the sum of a gap G (see FIG. 8) between one turbine vane platform 1340 and an adjacent turbine vane platform 1340 and the widths W4 of two first grooves 1341 formed in the one turbine vane platform 1340 and the adjacent turbine vane platform 1340. That is, the size of the third width W3 is preferably represented as (W1 or W2)<W3<(2*W4+G).

Meanwhile, he gap G is largest when the gas turbine is stopped, and may become smaller due to centrifugal force and thermal expansion, etc. during the operation of the gas turbine. Accordingly, in consideration of the minimum gap G during the operation of the gas turbine, the width W3 of each of the extension part 3310 and the bent part 3320 is preferably smaller than the sum of the gap G and the widths of the two first grooves 1341. The minimum gap G may vary depending on the type of gas turbine and may be determined through repeated test runs on a gas turbine prototype to be installed.

When the turbine vane platform sealing assembly 3000 configured as described above is mounted between the turbine vane platforms 1340, it is possible to prevent low-temperature and high-pressure compressed air supplied to the turbine vane platform 1340 from leaking toward the turbine vane 1330 through which high-temperature and low-pressure combustion gas flows. In addition, when removing the turbine vane, the turbine vane platform, or the vane platform sealing assembly for the maintenance of the gas turbine in which the turbine vane platform sealing assembly 3000 is installed, at least one of the sealing members can be prevented from being detached from the turbine vane platform due to the coupling of the second sealing member and the third sealing member to each other, thereby improving the stability and ease of operation.

While the embodiment of the present disclosure has been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure.

What is claimed is:

1. A turbine vane platform sealing assembly comprising:
- a first sealing member inserted into a first groove formed in a turbine vane platform in a first direction, the first sealing member extending in the first direction;
- a second sealing member inserted into a second groove formed in a second direction intersecting the first direction of the turbine vane platform, with an end part of the second sealing member being in contact with an upper surface of the first sealing member, and a portion of a third sealing member being inserted into one side surface of the second sealing member; and
- the third sealing member having a portion formed by extending in the first direction and a remaining portion formed by bending in the second direction at a bend line at which the first sealing member and the second sealing member contact, with a third directional width of the third sealing member being greater than a third directional width of each of the first sealing member and the second sealing member.

2. The turbine vane platform sealing assembly of claim 1, wherein the third sealing member comprises:
- an extension part formed by extending up to the bend line in the first direction and disposed on an upper surface of the first sealing member, and
- a bent part formed by bending in the second direction at the bend line,
- wherein a third directional width of each of the extension part and the bent part is greater than the width of each of the first sealing member and the second sealing member.

3. The turbine vane platform sealing assembly of claim 1, wherein when the width of the first sealing member is a first width W1 and the width of the second sealing member is a second width W2,
- a third width W3 which is the width of the third sealing member is greater than each of the first width and the second width and is smaller than a sum of a gap G between any one turbine vane platform and an adjacent turbine vane platform and widths W4 of two first grooves formed in the any one turbine vane platform and the adjacent turbine vane platform.

4. The turbine vane platform sealing assembly of claim 1, wherein at least a portion of the bent part of the third scaling member is inserted into the second scaling member so that movement of the third sealing member is restricted.

5. The turbine vane platform sealing assembly of claim 4, wherein the second sealing member comprises:
- a plate-shaped sealing body for-med with a first thickness; and
- a sealing head formed with a second thickness greater than the first thickness and having an insertion groove formed in a portion connecting with the sealing body.

6. The turbine vane platform sealing assembly of claim 5, wherein the third scaling member comprises:
- an extension part formed by extending in the first direction and disposed on the upper surface of the first sealing member;
- a bent part formed by bending in the second direction at a point at which the first sealing member and the second sealing member contact; and
- a protruding tab formed to protrude from an upper surface of the bent part and formed in a shape corresponding to the insertion groove.

7. The turbine vane platform sealing assembly of claim 1, wherein a sum of the thickness of the sealing body and a thickness of the bent part is the same as the second thickness of the sealing head.

8. A turbine vane which is fixedly mounted within a housing by a turbine vane outer platform and a turbine vane inner platform, wherein at least one of the turbine vane outer platform and the turbine vane inner platform comprises a turbine vane platform sealing assembly, wherein the turbine vane platform sealing assembly comprises:
- a first sealing member inserted into a first groove formed in a turbine vane platform in a first direction, the first sealing member extending in the first direction;
- a second sealing member inserted into a second groove formed in a second direction intersecting the first direction of the turbine vane platform, with an end part of the second sealing member being in contact with an upper surface of the first sealing member, and a portion of a third sealing member being inserted into one side surface of the second sealing member; and
- the third sealing member having a portion formed by extending in the first direction and a remaining portion formed by bending in the second direction at a bend line at which the first sealing member and the second sealing member contact, with a third directional width of the third sealing member being greater than a third directional width of each of the first sealing member and the second sealing member.

9. The turbine vane of claim 8, wherein the third sealing member comprises:

an extension part formed by extending up to the bend line in the first direction and disposed on an upper surface of the first sealing member, and a bent part formed by bending in the second direction at the bend line, wherein a third directional width of each of the extension part and the bent part is greater than the width of each of the first sealing member and the second sealing member.

10. The turbine vane of claim 8, wherein at least a portion of the bent part of the third sealing member is inserted into the second sealing member so that movement of the third scaling member is restricted.

11. The turbine vane of claim 10, wherein the second sealing member comprises:

a plate-shaped sealing body formed with a first thickness; and a sealing head formed with a second thickness greater than the first thickness and having an insertion groove formed in a portion connecting with the sealing body.

12. The turbine vane of claim 11, wherein the third sealing member comprises:

an extension part formed by extending in the first direction and disposed on the upper surface of the first sealing member;

a bent part formed by bending in the second direction at a point at which the first scaling member and the second scaling member contact; and a protruding tab formed to protrude from an upper surface of the bent part and formed in a shape corresponding to the insertion groove.

13. The turbine vane of claim 12, wherein a sum of the thickness of the sealing body and a thickness of the bent part is the same as the second thickness of the sealing head.

14. A gas turbine comprising:

a compressor configured to suck and compress external air;

a combustor configured to mix fuel with air compressed in the compressor and combust a mixture of the fuel and the compressed air; and a turbine having turbine blades and turbine vanes mounted therein, the turbine blades being rotated by combustion gas discharged from the combustor, wherein each of the turbine vanes is fixedly mounted within a housing by a turbine vane outer platform coupled to an outer end thereof and a turbine vane inner platform coupled to an inner end thereof, wherein at least one of the turbine vane outer platform and the turbine vane inner platform comprises a turbine vane platform sealing assembly, wherein the turbine vane platform sealing assembly comprises:

a first sealing member inserted into a first groove formed in a turbine vane platform in a first direction, the first sealing member extending in the first direction;

a second sealing member inserted into a second groove formed in a second direction intersecting the first direction of the turbine vane platform, with an end part of the second scaling member being in contact with an upper surface of the first sealing member, and a portion of a third sealing member being inserted into one side surface of the second sealing member; and the third sealing member having a portion formed by extending in the first direction and a remaining portion formed by bending in the second direction at a bend line at which the first sealing member and the second sealing member contact, with a third directional width of the third sealing member being greater than a third directional width of each of the first sealing member and the second sealing member.

15. The gas turbine of claim 14, wherein the third scaling member comprises:

an extension part formed by extending up to the bend line in the first direction and disposed on an upper surface of the first sealing member, and a bent part formed by bending in the second direction at the bend line, wherein a third directional width of each of the extension part and the bent part is greater than the width of each of the first sealing member and the second sealing member.

16. The gas turbine of claim 14, wherein when the width of the first sealing member is a first width W1 and the width of the second sealing member is a second width W2, a third width W3 which is the width of the third sealing member is greater than each of the first width and the second width and is smaller than a sum of a gap G between any one turbine vane platform and an adjacent turbine vane platform and widths W4 of two first grooves formed in the any one turbine vane platform and the adjacent turbine vane platform.

17. The gas turbine of claim 14, wherein at least a portion of the bent part of the third sealing member is inserted into the second sealing member so that movement of the third sealing member is restricted, and the second sealing member comprises:

a plate-shaped sealing body formed with a first thickness, and a sealing head formed with a second thickness greater than the first thickness and having an insertion groove formed in a portion connecting with the sealing body.

18. The gas turbine of claim 17, wherein the third sealing member comprises:

an extension part formed by extending in the first direction and disposed on the upper surface of the first sealing member;

a bent part formed by bending in the second direction at a point at which the first sealing member and the second sealing member contact; and a protruding tab formed to protrude from an upper surface of the bent part and formed in a shape corresponding to the insertion groove.

19. The gas turbine of claim 18, wherein a sum of the thickness of the sealing body and a thickness of the bent part is the same as the second thickness of the sealing head.

* * * * *